United States Patent

[11] 3,546,357

[72] Inventors William F. Mac Pherson
Martinsville;
Alfred S. Windeler, Madison, New Jersey

[21] Appl. No. 788,756
[22] Filed Jan. 3, 1969
[45] Patented Dec. 8, 1970
[73] Assignee Bell Telephone Laboratories, Incorporated
Murray Hill, Berkeley Heights, N.J.
a corporation of New York

[54] CABLE WITH FULLY CONTROLLABLE PAIR TWIST LENGTH
3 Claims, 4 Drawing Figs.

[52] U.S. Cl. .......... 174/34, 174/113
[51] Int. Cl. .......... H01b 11/02
[50] Field of Search .......... 174/33, 34, 113; 57/139

[56] References Cited

UNITED STATES PATENTS 1,740,403 12/1929 Jordan .......... 174/34
3,025,656 3/1962 Cook .......... 174/34UX

FOREIGN PATENTS 835,188 5/1960 Great Britain .......... 174/34

*Primary Examiner*—Lewis H. Myers
*Assistant Examiner*—A. T. Grimley
*Attorneys*—R. J. Guenther and Edwin B. Cave

ABSTRACT: Attenuation deviation and crosstalk deviation in a communications cable are reduced to low figures by a pair twist scheme in which pairs undergo different twist lengths from section to section of the line. All pairs experience ultimately the same degree of twist and hence are of substantially the same conductor length. Apparatus for realizing such twist includes stationary pair-twisting motors and a rotating takeup capstan.

| N-PAIR NUMBER | N-SECTIONS (EQUALS ONE SPAN) | | | | | | |
|---|---|---|---|---|---|---|---|
| | 1 | 2 | 3 | 4 | 5 | 6 | 7 |
| I | A | B | C | D | E | F | G |
| II | B | C | D | E | F | G | A |
| III | C | D | E | F | G | A | B |
| IV | D | E | F | G | A | B | C |
| V | E | F | G | A | B | C | D |
| VI | F | G | A | B | C | D | E |
| VII | G | A | B | C | D | E | F |

| N-PAIR NUMBER | N-SECTIONS (EQUALS ONE SPAN) | | | | | | |
|---|---|---|---|---|---|---|---|
| | 1 | 2 | 3 | 4 | 5 | 6 | 7 |
| I | A | B | C | D | E | F | G |
| II | B | C | D | E | F | G | A |
| III | C | D | E | F | G | A | B |
| IV | D | E | F | G | A | B | C |
| V | E | F | G | A | B | C | D |
| VI | F | G | A | B | C | D | E |
| VII | G | A | B | C | D | E | F |

INVENTORS W. F. MACPHERSON
A. S. WINDELER
BY Charles E. Graves
ATTORNEY

CABLE WITH FULLY CONTROLLABLE PAIR TWIST LENGTH

This invention relates to multiple-pair cable manufacture; and specifically to apparatus for continuously twisting conductor pairs and thereafter stranding the pairs, in which the twist length for each pair is fully controllable.

BACKGROUND OF THE INVENTION

In the manufacture of multiple-pair cable, it is routine practice to apply differing twist to adjacent pairs to reduce the incidence of crosstalk. In such cable, it also is desirable to keep the attenuation deviation and crosstalk deviation as low as possible. Improved crosstalk can be achieved by employing relatively short pair twists, i.e., of the order of about 1 inch. Short twists, however, bring about a large difference in actual conductor length between the shortest and the longest twists in a given strand. This difference leads, of course, to an undesirably large attenuation deviation among the conductor pairs in the strand.

This invention is addressed, first, to a conductor twist configuration or scheme which permits both attenuation deviation and crosstalk deviation to be maintained at low levels. Secondly, the invention is directed to apparatus which will continuously produce stranded twisted conductors conforming to that twist configuration and, indeed, to substantially any twist characteristic that might be desired.

OBJECTS OF THE INVENTION

To reduce as much as possible both attenuation deviation and crosstalk deviation in a multipair telephone cable, while maintaining a low average crosstalk;

To apply during manufacture substantially any desired twist length to each conductor pair; and To vary at will the twist length in any of several conductor pairs in an assembly process that includes stranding the twisted pairs, without having to shut the line down to change the twist.

SUMMARY OF THE INVENTION

The twist configuration embraced by the invention comprises multipair units of, for example, seven pairs. A different twist length is applied evenly to each conductor pair along a specified longitudinal section of the unit. In the succeeding section, each pair is given a twist length different from what it had in the preceding unit section, and so on for each following section. Within any section, the same twist length appears but once. If there are N pairs in the unit, there are pursuant to the invention also N different twist lengths. The latter are chosen for their ability in combination to reduce crosstalk among themselves to a minimum. All N twist lengths appear in each section. In a succession of N such sections, each conductor pair utilizes all N specified twist lengths albeit in different sequences, with the result that each pair has the same average twist length over the N sections. The conductors of all pairs are the same actual length over the N sections. The attenuation deviation due to pair twist difference accordingly is substantially zero.

Pursuant to another aspect of the inventive twist scheme, a section length which is a multiple of all N twist lengths avoids residual coupling resulting from fractional twist lengths at the end of each section.

Machinery for producing the above twist configuration, advantageously, must permit the twist length of a given conductor pair to be varied at will without stopping the machine during the assembly of a stranded unit. In one form of such apparatus, each pair originates from spools mounted in a rotatable motor-driven supply carriage. Each pair then is led to a twisting motor which is one of a cluster of such motors directly adjacent to a stranding faceplate. Each twisting motor is separately controlled and coordinated with the associated carriage supply motor, such that no twist greater than about one turn is imparted to the pair between motors. A binder then is applied and the twisted pairs are stranded in a rotating carriage and takeup.

The invention, its further objects, features and advantages will be more clearly apprehended from a reading of the description to follow of an illustrative embodiment.

DETAILED DESCRIPTION OF AN ILLUSTRATIVE EMBODIMENT

The pair twist configuration can best be described by reference to FIG. 1, which is a matrix showing twist length over one span of a communications line of twisted pairs. Seven sections, numbered 1 through 7 are depicted for illustrative purposes, although more or fewer are also workable. The seven sections in total make up the one span. To correspond with the number of sections, seven individual conductor pairs, numbered Roman numerals I—VII are present throughout the span. The seven different selected twist lengths are designated A—G.

In any given one of the sections 1—7, all seven different twist lengths A—G are represented. In any given one of the conductor pairs I—VII and within a single span, all seven different twist lengths A—G are also present. Thus, within any succession of seven adjacent sections, all seven different twist lengths appear in each individual pair. Accordingly, the actual lengths of each individual conductor over the succession of seven adjacent sections are substantially the same. The shortest twist length, which has caused the undesirable large "-takeup," occurs in all pairs and thus is compensated. Attenuation deviation from takeup is reduced to almost zero.

Twist length values are chosen in approximately even steps, avoiding values that are an even-numbered multiple of another value. A typical set of values for twist lengths A—G are, respectively: 1.1, 1.7, 2.4, 3.0, 3.6, 4.3, and 4.9 inches. Since it also is desirable to choose the section length to be a multiple of all seven twist lengths, the section length for the recited twist length is approximately 972 inches or an integral multiple thereof.

A communications line using the pair twist scheme detailed above can in general be viewed as a plurality of spans, each comprising N sections of equal length. Insulated continuous conductor pairs numbering N make up the spans. N different specific twist lengths are used; no twist length other than one of these appears anywhere in the span. In any given section, the pairs collectively exhibit all N twist lengths. In any succession of N adjacent sections, all N twist lengths appear in each individual pair. A communication line made of such spans is characterized by the lowest possible attenuation deviation and crosstalk deviation.

Construction of such a span of twisted conductors requires a machine which combines twisting and stranding in one operation. Furthermore, changes in twist length must be made rapidly while the machine is in operation.

Figures 1, 4:
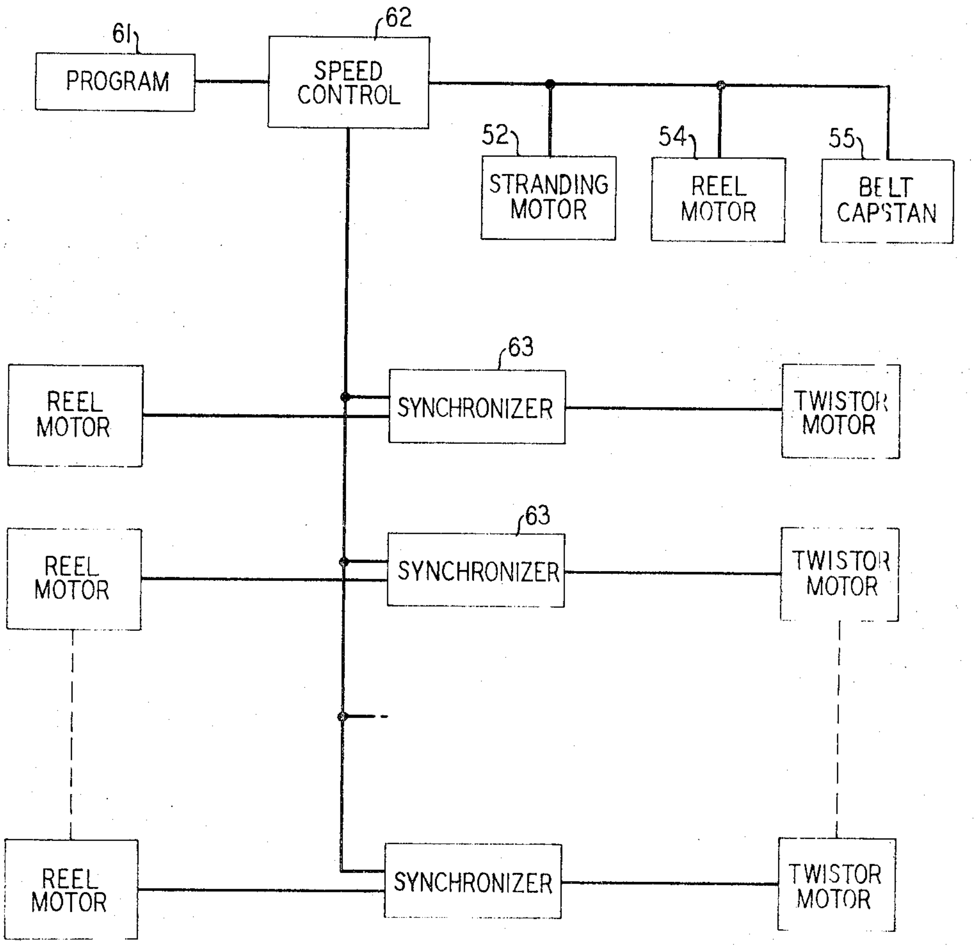
FIG. 1 is a table showing a specific commutated pair twist scheme.
FIG. 4 is a circuit schematic diagram of a speed control system.
Figure 2:
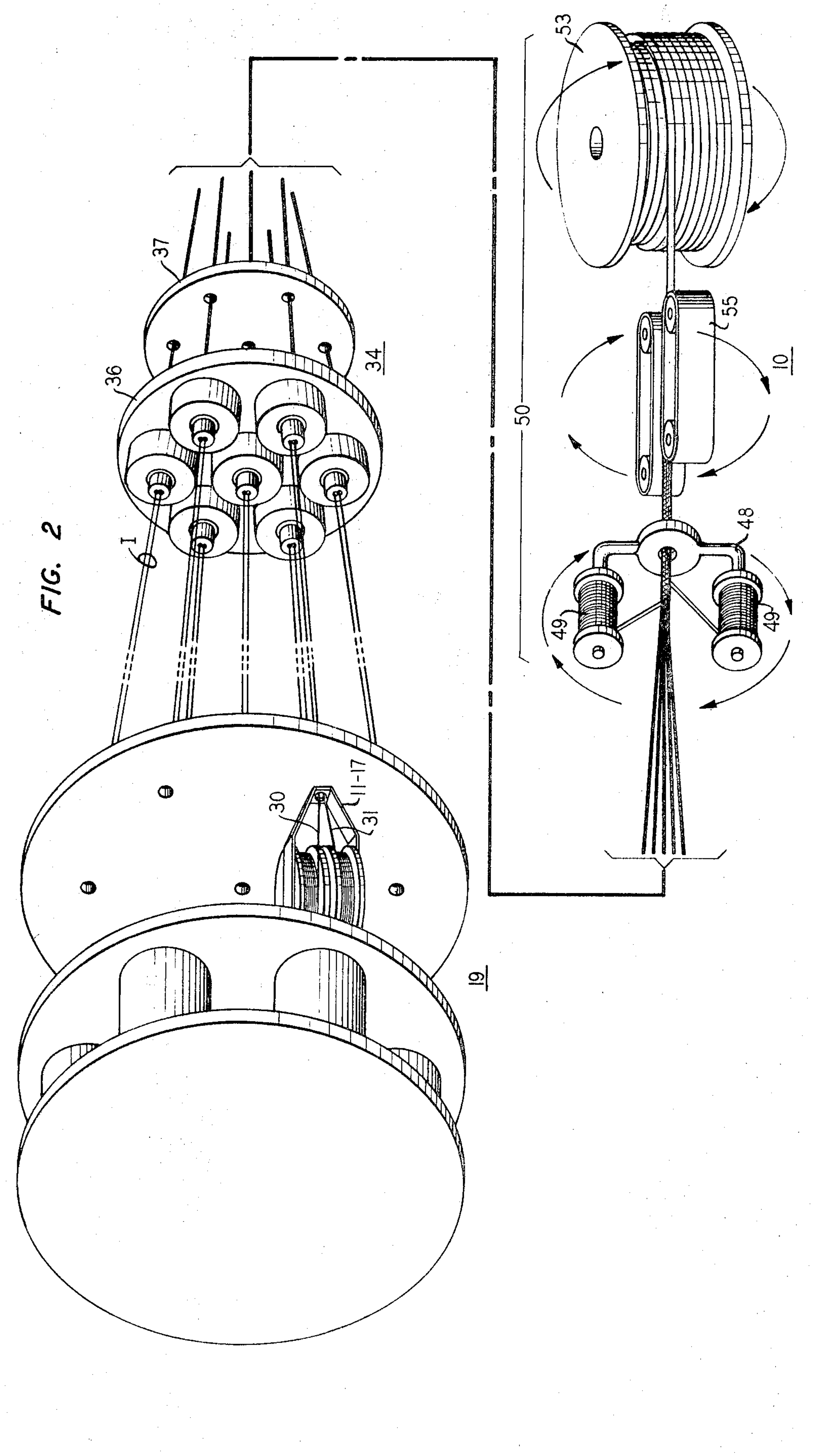
FIGS. 2 and 3 are schematic views in side perspective of apparatus for producing said pair twist scheme.
Figure 3:
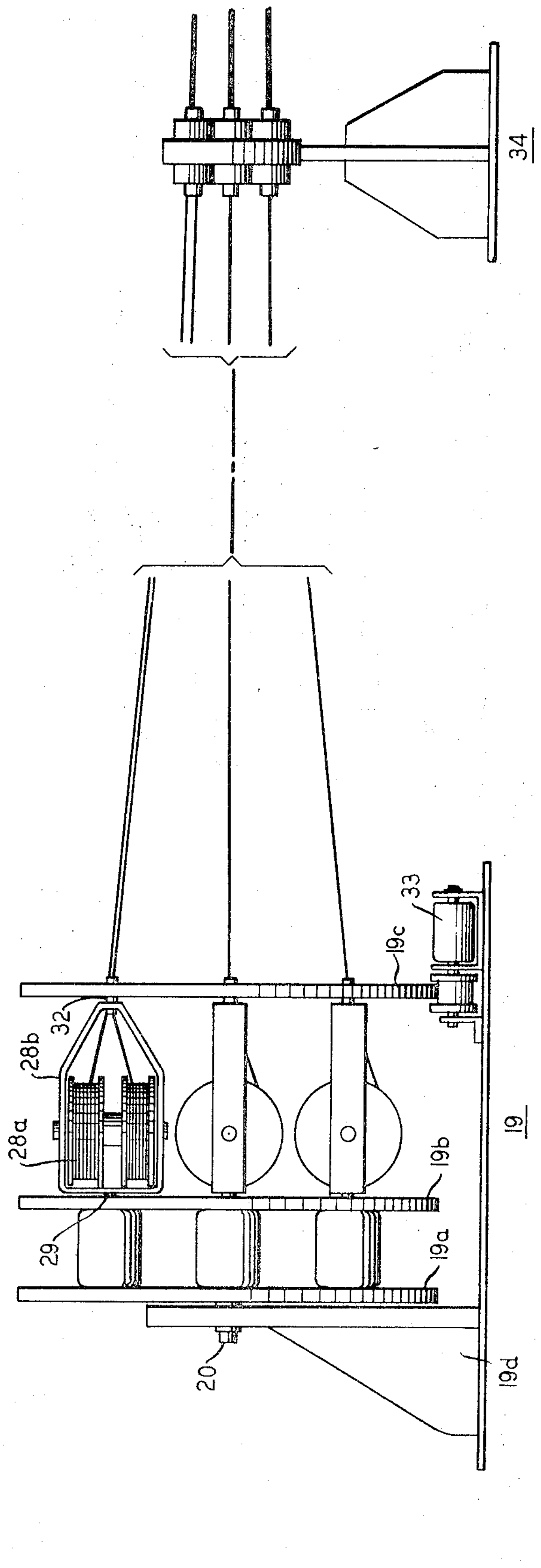

FIGS. 2 and 3 depict such a machine, designated 10, which is in essence a seven pair twister-strander with rotating takeup Capstan Machine 10 consists of seven supply carriages 11—17 each rigidly mounted in a frame 18 as best shown in FIG. 3. Six of the carriages are uniformly located in circular fashion with a seventh, carriage 17, in the center. Each carriage 11—17 is rotated by a variable speed motor denoted 21—27 respectively. Within each carriage are mounted two conductor spools 28*a*, 28*b* about shaft 29. For each carriage, the spools feed insulated conductors 30, 31 through a bushing 32. In each case, conductors 30, 31 are associated as pairs which as in FIG. 1 are designated with the Roman numerals I—VII.

As viewed in FIGS. 2 and 3, the carriages 11—17 and motors 21—27 are supported on a rigid frame assembly 19, which consists of, for example plates 19*a*, 19*b*, 19*c* supported by suitable sturdy stands such as 19*d* (only one stand shown). For convenience of spool-changing assembly 19 is rotatable about pivot 20 by motor 33, for example, which also supports plate 19*c*.

The pairs I—VII exit from bushings 32, pulled by the force exerted by the strander as will be described. For a substantial stretch, the pairs are kept untwisted as they converge to twisting station 34. There, seven twisting motors 41—47 receive in their shafts 35 the respective pairs I—VII. The shafts 35 each can have separate parallel through passages for the conductors of the pairs shown; or the shafts 35 can be hollow and the conductors pass through a fixed bushing with parallel passages therein. In either case, the passages as shown in FIG. 2 apply the twist as a function of how fast the twisting motor is turning and how fast the pairs are traveling through shaft 35.

The twisting motors are fixedly mounted in a stationary frame such as 36. Once twisted, the pairs travel through a suitably orificed stationary faceplate 37 and thence into a rotating strander 50. The latter is mounted as a unit in a carriage (not shown) which is rotatable about its center axis 51 as by the motor denoted 52. Binder tape is applied from fixture 48 which supports two spools 49. A takeup reel 53, rotated by stranding motor 54, receives the stranded conductors. The pairs are brought from faceplate 37 to a Capstan belt 55 stationed forward of reel 53 on the carriage center axis 51. As the overall carriage rotates, stranding is imparted to the pairs. Capstan belt 55 grips the stranded unit, helping feed the unit on to reel 53.

Let it be assumed that the speed of reel motor 54 and belt 55 is set, thus determining the rate of advance of pairs through twisting motors 41—47. Given that rate, the speed of each twister motor 41—47 is set to apply the desired twist length to its pair. Whatever rate a given twister motor is set at, the rate must be the same for its corresponding spool carriage motor. Also, when the rate is changed for the twister motor, so too must the rate be changed for the spool carriage motor. Further, all rate changes must occur over as short a time as possible.

FIG. 4 illustrates in block diagram form a suitable speed regulation circuit. The section length and twist lengths are translated into a program 61, the output of which is fed into a speed control unit 62 which sets the twister motor speed and times the speed changes. Various ways may be employed to keep the speeds of the twister motors and their respective spool carriage motors in 1:1 synchronization, and the function is merely illustrated in synchronizer blocks 63. Precision speed control is necessary from twisting motors 41—47; the requirement for the larger carriage motors 21—27 is that they not lag or lead the twisting motors by more than about one revolution. Control 62 also directs the speeds of stranding motor 52 reel motor 54 and belt Capstan 55 to values suitably coordinated with the twisting and stranding specifications of the unit being produced.

Other methods can, of course, be envisioned to apply twist separately to the pairs, such as an adaptation of the conventional rotating flyer twister (not shown) familiar to the industry. In such case, each flyer bow replaces a rotating carriage, i.e., the bow rotates around a stationary carriage. A description of a preferred flyer twister for the practice of the present invention is found in the U.S. Pat. application of H. W. Friesen and W. F. MacPherson, Ser. No. 789,750, filed Jan. 8, 1969. Since in all cases the twisting must take place over as short a distance as possible, the twisting mechanism should be mounted close to the faceplate, whereafter the pairs are stranded to lock in the applied twist.

The invention is embraced within the spirit of the following claims.

We claim:

1. A twisted pair communications line comprising:
a plurality of spans, each comprising N sections of equal length;
N insulated conductor pairs running in said spans and twisted only with N different specific twist lengths;
in any given section the pairs collectively having all said specific lengths; and
within any succession of N adjacent sections, all N twist lengths appearing in each individual pair.

2. A communications line pursuant to claim 1 wherein said section length is a multiple of all N twist lengths.

3. A communications line pursuant to claim 2, wherein N equals seven: and wherein the twist lengths vary from about 1.1 to 4.9 inches in discrete steps in which no value is an even multiple of any other.